United States Patent Office.

H. C. BECKER, OF NEW YORK, N. Y.

Letters Patent No. 62,997, dated March 19, 1867.

IMPROVED STARCH SIRUP.

The Schedule referred to in these Letters Patent and making part of the same.

TO ALL WHOM IT MAY CONCERN:

Be it known that I, H. C. BECKER, of the city, county, and State of New York, have invented a composition called Crystal Sirup, used by confectioners and others to avoid graining, opacity, crumbling, and fermentation of sugar candies and similar preparations. I do hereby declare that the following is a full, clear, and exact description of the process of preparing it, which will enable others skilled in the art to make and use the same.

I take coarsely powdered corn and rice, soak it in water until it becomes soft and mealy. For every ten parts by weight of the amylaceous material some four hundred parts of water are taken, and the whole mixture boiled with about ten per cent. of sulphuric acid. After cooling and standing for some time the free acid is neutralized by chalk or lime. The new compound is then entirely freed from starch and other suspended impurities by the use of a centrifugal machine. The next proceeding is to impregnate the mass with a mucilage prepared by treating one part of gum Arabic with thirty-two parts of boiling water, whence the gelatinous mixture is pressed through a fine sieve. The whole compound is then by the aid of steam repeatedly evaporated and filtered through charcoal. Finally the gummy sirup is so much concentrated or boiled down by means of steam, that the residue may be drawn into long threads between the fingers. This sirup does not granulate itself, and prevents the crystallization or graining of cane sugar likewise. The crystal sirup for which I claim a patent is not designed for adulterations, but as an improvement in the appearance, transparency, taste, and durableness of confectionery. It preserves fruit, and is nutritious and wholesome. It differs from all kinds of glucose that though highly concentrated no portion of it will granulate or solidify.

Having thus described my invention, what I claim as new, and desire to secure by Letters Patent, is—

A composition, which is made of the ingredients and substantially in the manner herein set forth and described.

H. C. BECKER.

Witnesses:
    WM. F. McNAMARA,
    ALEX. F. ROBERTS.